US010121011B2

(12) United States Patent
Kwiat et al.

(10) Patent No.: US 10,121,011 B2
(45) Date of Patent: Nov. 6, 2018

(54) APPARATUS, METHOD AND ARTICLE OF MANUFACTURE FOR PARTIALLY RESISTING HARDWARE TROJAN INDUCED DATA LEAKAGE IN SEQUENTIAL LOGICS

(71) Applicant: THE UNITED STATES OF AMERICA AS REPRESENTED BY TE SECRETARY OF THE AIR FORCE, Washington, DC (US)

(72) Inventors: Kevin Kwiat, Whitesboro, NY (US); Charles Kamhoua, Liverpool, NY (US); Laurent Njilla, Rome, NY (US); Yiyu Shi, Granger, IN (US); Travis Schulze, St. Louis, MO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/397,142

(22) Filed: Jan. 3, 2017

(65) Prior Publication Data
US 2018/0137290 A1 May 17, 2018

Related U.S. Application Data

(60) Provisional application No. 62/422,611, filed on Nov. 16, 2016.

(51) Int. Cl.
*G06F 21/00* (2013.01)
*G06F 21/60* (2013.01)
(Continued)

(52) U.S. Cl.
CPC ............. *G06F 21/60* (2013.01); *G06F 21/72* (2013.01); *G06F 21/79* (2013.01); *G10L 15/02* (2013.01);
(Continued)

(58) Field of Classification Search
CPC .......... G06F 21/60; G06F 21/72; G06F 21/79; H04L 9/002; H04L 63/162
(Continued)

(56) References Cited

U.S. PATENT DOCUMENTS

| 4,941,143 A * | 7/1990 | Twitty ................... G08C 15/00 370/445 |
| 5,034,882 A * | 7/1991 | Eisenhard ............. G06F 15/173 712/30 |

(Continued)

OTHER PUBLICATIONS

C. Kamhoua, M. Rodriguez and K Kwiat. Testing for Hardware Trojans: A Game-Theoretic Approach. Decision and Game Theory for Security. Lecture Notes in Computer Science, 8840 (2014), 360-369.
(Continued)

*Primary Examiner* — Hosuk Song
(74) *Attorney, Agent, or Firm* — Joseph A. Mancini (57) ABSTRACT

Apparatus, method and article of manufacture providing a randomized encoding scheme for sequential logics, for resistance to data leakage. Invention employs dual-rail encoding to randomize the information in the chip, and employs three-dimensional integration technology to protect the critical information that is needed to decode the data anywhere on-chip. With the present invention, even when the entire design is completely known to the attacker who also has full access to the outsourced portion, it is still not always possible to identify the information in the chip using data leakage Trojans.

8 Claims, 7 Drawing Sheets

(51) Int. Cl.
 *G06F 21/72* (2013.01)
 *H04L 9/00* (2006.01)
 *G06F 21/79* (2013.01)
 *H04L 12/751* (2013.01)
 *H04L 12/707* (2013.01)
 *H04L 29/06* (2006.01)
 *G10L 15/02* (2006.01)
 *G10L 25/84* (2013.01)
 *H04L 12/741* (2013.01)
 *G10L 15/16* (2006.01)
 *G10L 25/21* (2013.01)
 *G10L 25/24* (2013.01)
 *G10L 25/90* (2013.01)

(52) U.S. Cl.
 CPC .............. *G10L 25/84* (2013.01); *H04L 9/002* (2013.01); *H04L 45/02* (2013.01); *H04L 45/22* (2013.01); *H04L 63/162* (2013.01); *G10L 15/16* (2013.01); *G10L 25/21* (2013.01); *G10L 25/24* (2013.01); *G10L 25/90* (2013.01); *H04L 45/54* (2013.01); *H04L 2209/08* (2013.01); *H04L 2209/12* (2013.01)

(58) Field of Classification Search
 USPC .......................... 713/174, 192, 194; 380/46
 See application file for complete search history.

(56) References Cited

U.S. PATENT DOCUMENTS 5,113,498 A * 5/1992 Evan .......................... G06F 1/04
 710/8
5,842,033 A * 11/1998 Wise ...................... G06F 9/3867
 712/1
7,818,569 B2 * 10/2010 Devadas .................. G06F 21/31
 257/E23.179
7,904,731 B2 * 3/2011 Devadas .................. G06F 21/31
 257/E23.179
9,972,398 B2 * 5/2018 Thacker, III ............ G06F 21/75
2016/0063148 A1 * 3/2016 Hayashi .............. G06F 17/5009
 703/2

OTHER PUBLICATIONS

Charles A. Kamhoua, Hong Zhao, Manuel Rodriguez, and Kevin A. Kwiat, "A Game-Theoretic Approach to Testing for Hardware Trojans" Accepted at IEEE Transactions on Multi-Scale Computing Systems, Special Issue/Section on Hardware/Software Cross-Layer Technologies for Trustworthy and Secure Computing.

S. Narasimhan and S. Bhunia. Hardware Trojan Detection. Introduction to Hardware Security and Trust, (2012) 339-364.

J. Rajendran, Y. Pino, O. Sinanoglu and R. Karri. Security Analysis of Logic Obfuscation. Design Automation Conference (DAC), 2012 49th ACM/EDAC/IEEE,(2012), 83-89.

J. Rajendran, M. Sam, O. Sinanoglu and R. Karri. Security Analysis of Integrated Circuit Camouflaging. Proc. of the ACM SIGSAC Conference on Computer & Communications Security, (2013),709-720.

J. Valamehr, T. Sherwook, R. Kastner, D. Marangoni-Simonsen, T. Huffmire, C. Irvine and T. Levin. A 3-D Manufacturing Approach to Tustworthy System Development. IEEE Transactions on Computer-Aided Design of Integrated Circuits and Systems, 32, 4 (Apr. 2013), 611-615.

* cited by examiner

FIGURE 1

| Logic | Code |
|-------|----------|
| 0 | 00 or 11 |
| 1 | 10 or 01 |

| Input | Current State | Next State | Output |
|---|---|---|---|
| 0 | 0 | 1 | 0 |
| 1 | 0 | 0 | 0 |
| 0 | 1 | 0 | 1 |
| 1 | 1 | 1 | 1 |

302

| Input | Current State | Next State | Output |
|---|---|---|---|
| 00 | 00 | 10 or 01 | 00 or 11 |
| 01 | 00 | 00 or 11 | 00 or 11 |
| 10 | 00 | 00 or 11 | 00 or 11 |
| 11 | 00 | 10 or 01 | 00 or 11 |
| 00 | 01 | 00 or 11 | 01 or 10 |
| 01 | 01 | 10 or 01 | 10 or 01 |
| 10 | 01 | 10 or 01 | 10 or 01 |
| 11 | 01 | 00 or 11 | 01 or 10 |
| 00 | 10 | 00 or 11 | 01 or 10 |
| 01 | 10 | 00 or 11 | 01 or 10 |
| 10 | 10 | 00 or 11 | 01 or 10 |
| 11 | 10 | 00 or 11 | 01 or 10 |
| 00 | 11 | 10 or 01 | 00 or 11 |
| 01 | 11 | 00 or 11 | 00 or 11 |
| 10 | 11 | 00 or 11 | 00 or 11 |
| 11 | 11 | 10 or 01 | 10 or 01 |

| 406b | 406c | 406d | 406e | 409 | Conclusions |
|---|---|---|---|---|---|
| 0 | 0 | 1 | 1 | 0 | $D=0, r_1=0$ |
| 0 | 0 | 1 | 1 | 1 | $D=0, r_1=1$ |
| 1 | 1 | 0 | 0 | 0 | $D=1, r_1=1$ |
| 1 | 1 | 0 | 0 | 1 | $D=1, r_1=0$ |

702

| 406b | 406c | 406d | 406e | 409 | Conclusions |
|---|---|---|---|---|---|
| 0 | 0 | X | X | 0 | $D=0, r_1=0$ |
| 0 | 0 | X | X | 1 | $D=0, r_1=1$ |
| 1 | 1 | X | X | 0 | $D=1, r_1=1$ |
| 1 | 1 | X | X | 1 | $D=1, r_1=0$ |
| X | X | 0 | 0 | 0 | $D=1, r_1=1$ |
| X | X | 0 | 0 | 1 | $D=1, r_1=0$ |
| X | X | 1 | 1 | 0 | $D=0, r_1=0$ |
| X | X | 1 | 1 | 1 | $D=0, r_1=1$ |

703

| 406b | 406c | 406d | 406e | 409 | Conclusions |
|---|---|---|---|---|---|
| 0 | X | 0 | X | 0 | $D=0, r_1=0$ |
| 0 | X | 0 | X | 1 | $D=0, r_1=1$ |
| 1 | X | 1 | X | 0 | $D=1, r_1=1$ |
| 1 | X | 1 | X | 1 | $D=1, r_1=0$ |
| X | 0 | X | 0 | 0 | $D=1, r_1=1$ |
| X | 0 | X | 0 | 1 | $D=1, r_1=0$ |
| X | 1 | X | 1 | 0 | $D=0, r_1=0$ |
| X | 1 | X | 1 | 1 | $D=0, r_1=1$ |

704

| 406b | 406c | 406d | 406e | 409 | Conclusions |
|---|---|---|---|---|---|
| 0 | 0 | 0 | 0 | 0 | $D=0, r_1=0$ |
| 0 | X | 0 | X | 1 | $D=0, r_1=1$ |
| 1 | X | 1 | X | 0 | $D=1, r_1=1$ |
| 1 | X | 1 | X | 1 | $D=1, r_1=0$ |
| X | 0 | X | 0 | 0 | $D=1, r_1=1$ |
| X | 0 | X | 0 | 1 | $D=1, r_1=0$ |
| X | 1 | X | 1 | 0 | $D=0, r_1=0$ |
| X | 1 | X | 1 | 1 | $D=0, r_1=1$ |

FIGURE 7

APPARATUS, METHOD AND ARTICLE OF MANUFACTURE FOR PARTIALLY RESISTING HARDWARE TROJAN INDUCED DATA LEAKAGE IN SEQUENTIAL LOGICS

PRIORITY CLAIM UNDER 35 U.S.C. § 119(e)

This patent application claims the priority benefit of the filing date of a provisional application Ser. No. 62/422,611, filed in the United States Patent and Trademark Office on Nov. 16, 2016.

STATEMENT OF GOVERNMENT INTEREST

The invention described herein may be manufactured and used by or for the Government for governmental purposes without the payment of any royalty thereon.

BACKGROUND OF THE INVENTION

The relentless semiconductor scaling has resulted in a tremendous increase in manufacturing cost. As a result, many design houses have gone fabless and rely on foreign low-cost fabrication facilities to manufacture their products. Yet the globalization of semiconductor fabrication has posed a new security threat: as the trustworthiness of these facilities remain unknown, malicious parties or attackers can possibly insert malicious hardware, commonly referred to as Hardware Trojans, directly into the chip during the manufacturing process. Depending on the payload, there are two different types of hardware Trojans; Trojans that affects the functionality or reliability of a chip, and Trojans that capture the data being processed by a chip, known as data leakage Trojan. The consequences of data leakage Trojan can be devastating, as it can allow attackers to obtain encryption keys as they are processed or to possibly allow privilege escalation on a system.

Data leakage Trojan is usually very hard to detect for two reasons: it can maintain the original functionality of a chip even when triggered; and it typically results in little or no increase in the chip's area or power consumption. As such, it is almost impossible to detect it using methods such as runtime monitoring or post-silicon testing [1, 2]. On the other hand, in order for an attacker to successfully inject a data leakage Trojan, he or she must have a complete understanding of the design, so that critical information at desired locations can be obtained. This can be done either before fabrication by inspecting the netlist and layout, or after fabrication by reverse-engineering a chip procured from the fabrication facility or on the market. The former requires less effort yet the netlist and layout information is sometimes protected and not accessible to an attacker.

Based on this requirement, the most effective approaches to resist data leakage Trojan is through design for security (DFS) [3]. DFS focuses on making the design harder for the attacker to understand. The existing approaches include logic obfuscation, layout camouflaging or split manufacturing [3]. Obfuscation is a method of reworking the logic flow so that the actual computation being performed is not readily apparent [4]. This can mean convoluting the function with unnecessary paths/gates or even adding additional states or dead ends to state machines. Layout camouflaging performs similar obfuscation but on the layout [5]. Careful layouts can make a NAND and NOR gate look identical, which greatly increases the effort to decipher a full layout. Split manufacturing breaks up the design into lowest level silicon and upper level metals [6]. The two pieces are manufactured separately preventing an attacker in one location from having access to a complete design.

All these DFS methods focus on increasing the difficulty of establishing data leakage channels by the hardware Trojan. They can still be compromised when the same design undergoes multiple fabrication runs, which is quite often for large volume commercial products. In this case, attackers can procure a fabricated chip from one run and reverse-engineer the design. The hardware Trojans can then be designed and injected in subsequent runs. This scenario has mostly been overlooked and it remains an open question in the literature how to prevent data leakage when side channels are successfully established. This invention serves to provide a circuit-level design technique that can partially resist data leakage in sequential logics after data leakage Trojan is injected.

OBJECTS AND SUMMARY OF THE INVENTION

The features and advantages of the present invention described in this summary and the following detailed description are not all-inclusive. Many additional features and advantages will be apparent to one of ordinary skill in the art in view of the drawings, specification, and claims hereof.

It is an object of the present invention to provide sequential logics with partial resistance to hardware Trojan induced data leakage.

It is another object of the present invention to solve the untrustworthy fabrication risk problem by introducing a design method such that even when the design is entirely known to an attacker and a data leakage Trojan is injected subsequently, only partial information can be obtained.

It is yet another object of the present invention to randomize the encoding of binary logic, convert any sequential binary logic into one with randomized encoding, and partition a randomized encoded logic for split manufacturing and three-dimensional integration.

In a specific embodiment, the present invention a sequential logic circuit security apparatus, comprises at least two combinational logic circuit functions each having an output and at least one pair of logic inputs; at least two random logic state generators each randomly outputting a logic state 1 or 0; a first encoder for encoding each logic input of the at least one pair of logic inputs with a Boolean operation on a preselected one of the at least two random logic state generators; a multiplexer having an output, and at least two selectable inputs each being connected to a respective said output of said at least two combinational logic circuit functions wherein the multiplexer selects one of the outputs of the at least two combinational logic circuit functions according to the logic state of the at least two random logic state generators; a latch having an input connected to the output of the multiplexer, an output, and a clock input; an exclusive OR circuit having an output, a first input connected to the latch output, and a second input wherein the second input is encoded by a second encoder performing the Boolean operation on a current clock cycle state and a prior clock cycle state of the preselected one of said at least two random logic state generators.

In another embodiment of the present invention, a security method for a sequential logic circuit having at least two combinational logic circuit functions each having an output and at least one pair of logic inputs, comprising the steps of generating at least two random logic states each randomly comprising a logic state 1 or 0; encoding each logic input of the at least one pair of logic inputs with a Boolean operation on a preselected one of the at least two random logic states; selectively multiplexing the output of the at least two combinational logic circuit functions according to a logic state of the at least two random logic states; latching the multiplexed output of the at least two combinational logic circuit functions; exclusively OR'ing a first input comprising the multiplexed output of the at least two combinational logic circuit functions, with an encoded second input, wherein the second input is encoded by a step of performing the Boolean operation on a current clock cycle state and a prior clock cycle state of the preselected one of the at least two random logic states.

In yet another embodiment of the present invention, a secure logic chip as an article of manufacture, comprises a logic portion and a security portion, wherein the logic portion comprises a plurality of combinational logic circuits each having inputs and an output; the security portion comprises a random logic state generator producing two randomly generated logic states; a multiplexer having as inputs the outputs of the combinational logic circuits and having a selection among the inputs based upon the logic state of the two randomly generated logic states; a latch for latching an output of the multiplexer; and an exclusive OR for decoding an output of the latch as a function of at least one of the two randomly generated logic states and wherein the logic portion and the security portion are manufactured as separate chips and thereafter functionally integrated into the secure logic chip.

Briefly stated, the present invention puts forward a randomized encoding scheme for sequential logics, for resistance to data leakage. It uses dual-rail encoding to randomize the information in the chip, and uses three-dimensional integration technology to protect the critical information that is needed to decode the data anywhere on-chip. With the present invention, even when the entire design is completely known to the attacker who also has full access to the outsourced portion, it is still not always possible to identify the information in the chip using data leakage Trojans.

REFERENCES

[1] C. Kamhoua, M. Rodriguez and K. Kwiat. Testing for Hardware Trojans: A Game-Theoretic Approach. Decision and Game Theory for Security. Lecture Notes in Computer Science, 8840 (2014), 360-369.
[2] Charles A. Kamhoua, Hong Zhao, Manuel Rodriguez, and Kevin A. Kwiat, "A Game-Theoretic Approach to Testing for Hardware Trojans" Accepted at IEEE Transactions on Multi-Scale Computing Systems, Special Issue/Section on Hardware/Software Cross-Layer Technologies for Trustworthy and Secure Computing.
[3] S. Narasimhan and S. Bhunia. Hardware Trojan Detection. Introduction to Hardware Security and Trust, (2012) 339-364.
[4] J. Rajendran, Y. Pino, O. Sinanoglu and R. Karri. Security Analysis of Logic Obfuscation. Design Automation Conference (DAC), 2012 49th ACM/EDAC/IEEE, (2012), 83-89.
[5] J. Rajendran, M. Sam, O. Sinanoglu and R. Karri. Security Analysis of Integrated Circuit Camouflaging. Proc. Of the 2013 ACM SIGSAC Conference on Computer & Communications Security, (2013), 709-720.
[6] J. Valamehr, T. Sherwook, R. Kastner, D. Marangoni-Simonsen, T. Huffmire, C. Irvine and T. Levin. A 3-D Manufacturing Approach to Trustworthy System Development. IEEE Transactions on Computer-Aided Design of Integrated Circuits and Systems, 32, 4 (April 2013), 611-615.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENT

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

An invention for addressing the data leakage issue in sequential logics fabricated in untrustworthy fabrication facilities are discussed below. First, an embodiment will be shown describing designs with data leakage hardware Trojans injected, the target application of this invention. Second, several embodiments will be presented to show a new randomized encoding scheme to randomize the information processed in a sequential logic. Third, a procedure will be shown for implementing and using the randomized encoding scheme in designing logic functions with resistance to information leakage caused by hardware Trojans injected. Fourth, the conditions under which the information can still be uncovered will be summarized.

Figure 1:
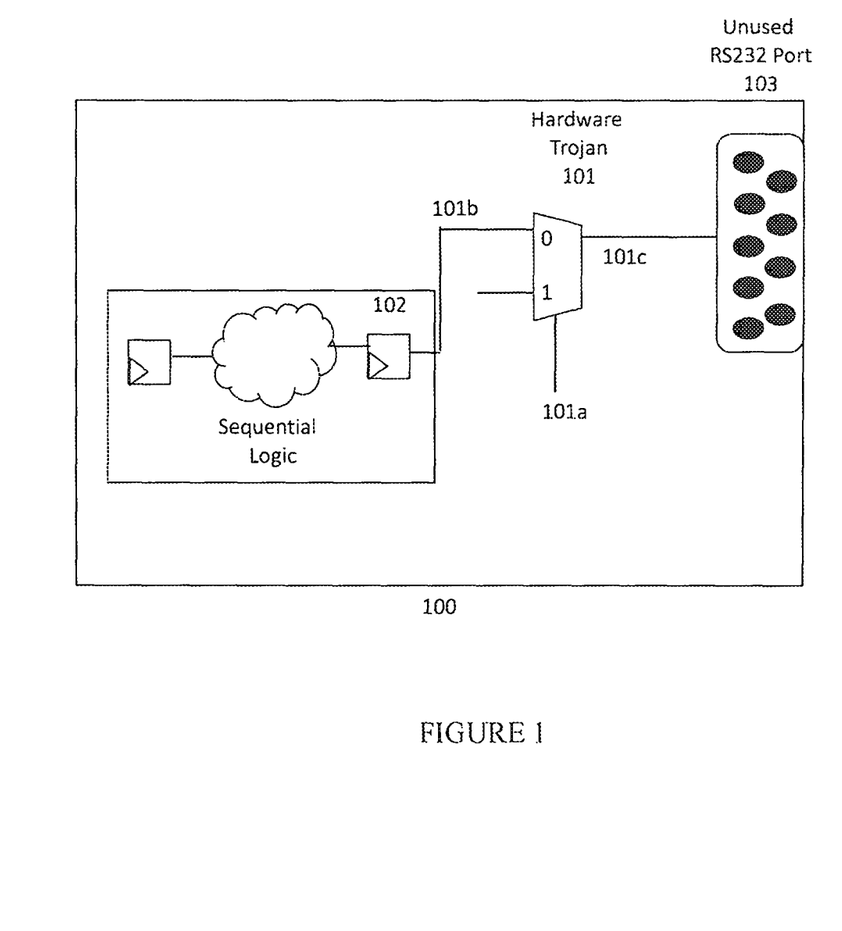
FIG. 1 depicts a design with a hardware Trojan injected according to an embodiment of the present invention

Referring to FIG. 1, one type of embodiment for a sequential logic 100 is shown. A hardware Trojan in the form of a MUX 101 is injected. When the select signal 101a is set to 0, the virus is not triggered and the sequential logic 102 operates normally. When the select signal 101a is set to 1, the virus is triggered and some binary bits 101b selected by the attacker from selected registers in the sequential logic is sent directly to an unused RS232 port 103, which can then be obtained by an attacker. Similar mechanisms can be used to create other types of side channels for data leakage.

To successfully inject a data leakage Trojan an attacker must be able to identify the gates and understand the function of a design. With this in mind, existing methods have focused on making the design harder to interpret. The current state of the art revolves around obfuscation, layout camouflaging, and split manufacturing. Obfuscation aims to make the function of the circuit less obvious by using nonstandard designs for common functions. Obfuscation can also be performed on state machines in the design, additional states are added leading to dead ends or black hole states. Layout camouflaging attempts to disguise the design by making the layouts of each gate indistinguishable. Extracting the netlist using image based techniques on the layout mask then becomes difficult. Finally, split manufacturing attempts to break up the design into front-end and back-end layers. The front-end consists of the lower silicon layers and first metal layers, the back-end being the remaining metal layers. Splitting the fabrication prevents an attacker in one location from having access to the complete design.

All of these existing countermeasures attempt to hide design information from attackers, and can be defeated if the same design is to be manufactured by multiple fabrication runs and an attacker can procure a chip in between and reverse engineer the design to obtain the full design information. The present invention is a useful, novel and a non-trivial solution to address this unsolved problem, and may be shown by several different embodiments.

The following embodiments of the present invention utilize randomized encoding to hide information. To accomplish this, the present invention uses a set of non-overlapping codes to encode logic values. To provide multiple representations (redundancy) so that randomness can be introduced, more than one bit to encode logic zero and logic one is needed.

Figure 2:
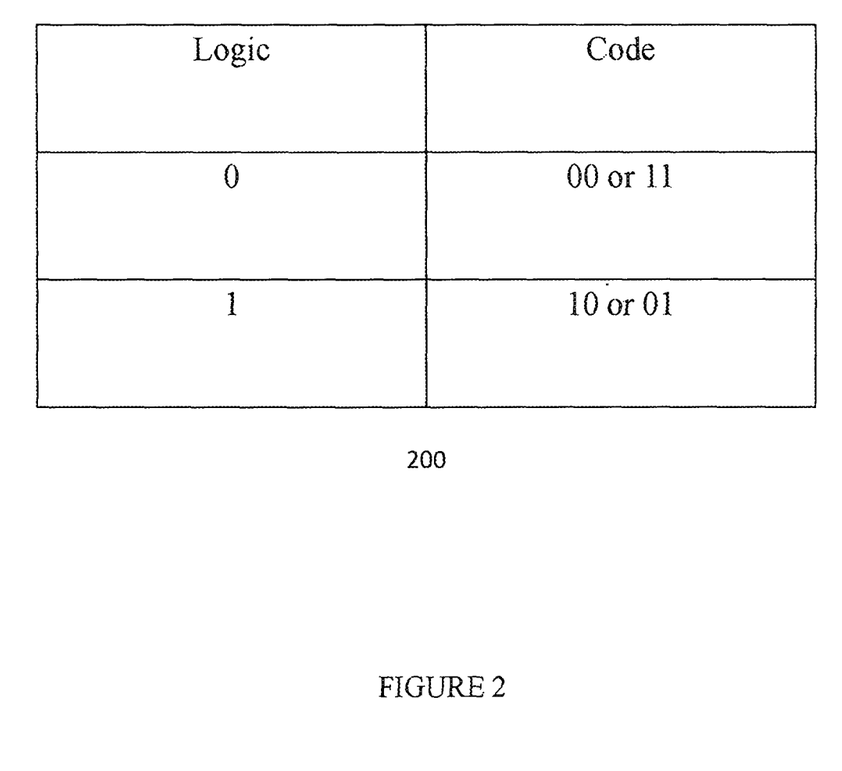
FIG. 2 is an example of a two-bit randomized encoding (dual-rail encoding).

Referring to FIG. 2, an example 200 is given where two bits are used. In this example (referred to as randomized dual-rail encoding), among the four code combinations 00, 01, 10, and 11, the present invention uses 00 and 11 to encode zero, and 01 and 10 to encode one. There are other embodiments where the code length and assignment can be different, but for the purpose of this embodiment and the embodiments described hereon, it is used so one skilled in the art may follow all the examples easily.

One of the two rails in the randomized dual-rail encoding will be generated from a random number generator, the value of which changes every clock cycle. In this embodiment and the embodiments hereafter, the rail from which the random number is generated is referred to as the random rail. The conversion between conventional logic and the corresponding randomized dual-rail logic then becomes straightforward. For any conventional binary logic value x and given the random logic value r on one of the two rails in dual-rail representation, the logic on the other rail can be decided through an XOR gate as $t = x \oplus r$. Note that the values of t, x and r must be from the same clock cycle for the equation to hold. In randomized dual-rail logic, the signals on both rails must be known at the same time to decode the value. Protecting the value then converts to protecting the random bit r of each signal from being identified by hardware Trojans.

Figure 3:
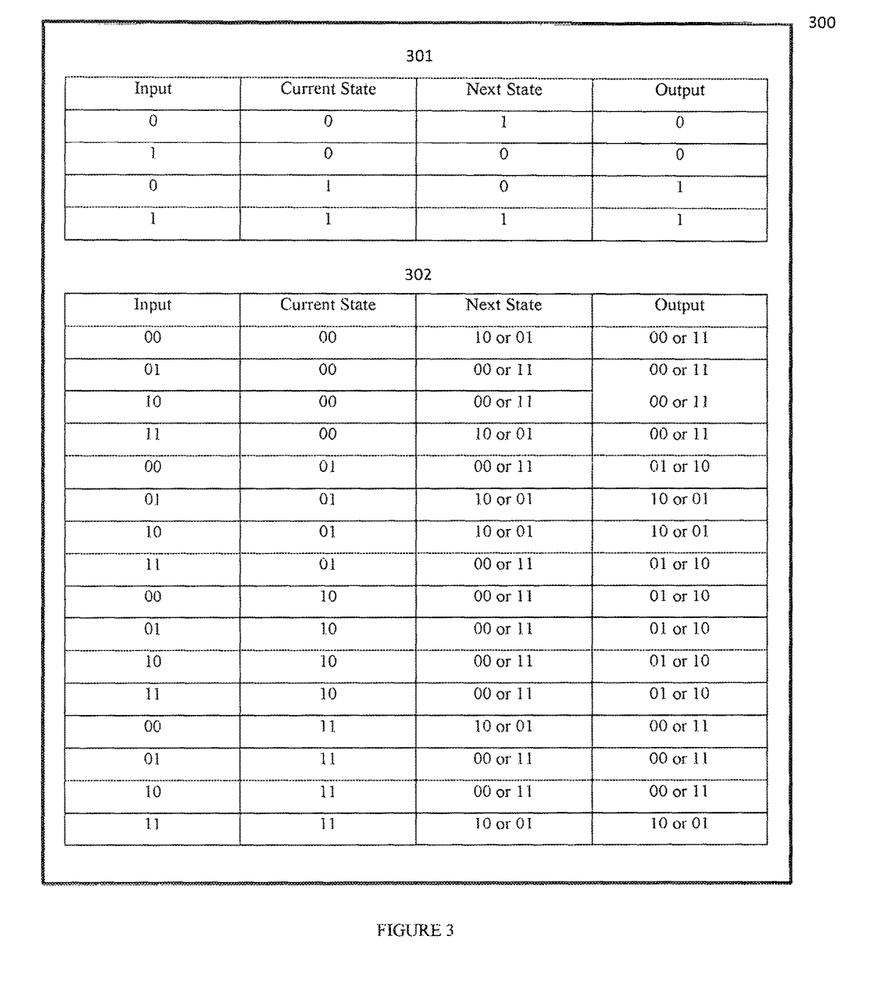
FIG. 3 shows an example of converting the state transition table of a conventional sequential logic into one with randomized dual-rail logic, which is useful for understanding various arrangements described herein.

The following embodiment shows an approach of converting conventional sequential logic to randomized dual-rail logic through state transit table. Referring to FIG. 3 for an example 300, which can help to better understand the various arrangements described herein. The binary values in each row in the state transition table 301 of the conventional sequential logic can be converted into the randomized dual-rail representation in the corresponding state transition table 302, which can then in turn be implemented. As the state transition table 302 is not unique, there can be many different corresponding implementations.

The above approach, though straightforward, may result in significant area and power overhead, and is not efficient for large-scale designs where the state transition diagram can be huge. The following embodiment shows an alternative approach that is more systematic and scalable. To reduce overhead yet maintain security, we let all the gates in a sequential logic share two random rails, which requires a minimum of two random number generators. A single random rail with one random number generator is not sufficient to hide the information for sequential logic and an attacker will still be able to identify the information. In other words, each signal is randomly selected to use one of the two rails to form its dual-rail representation. As such, any given Boolean function $f(x_1, x_2, x_3)$ with $x_1, x_2, x_3, \ldots$ as Boolean variables between two registers can be converted to the corresponding randomized dual-rail representation $$f(x_1, x_2, x_3, \ldots) \rightarrow f(t_1 \oplus r_1, t_2 \oplus r_2, t_3 \oplus r_1, \ldots) \oplus r_1 \quad \text{(EQN. 1)}$$

where $r_1, r_2$ are the random logic values on the two common random rails, and $t_1, t_2, \ldots$ are the logic values on the other rail for signals $x_1, x_2, \ldots$, respectively. We have assumed that the conversion uses random rail $r_1$; that $t_1, t_3$ use $r_1$ when forming the randomized dual-rail representation, while $t_2$ uses $r_2$. i.e., $x_1 = t_1 \oplus r_1$, $x_2 = t_2 \oplus r_2$, $x_3 = t_3 \oplus r_1$, .... These can be arbitrarily chosen for primary inputs, and are decided from the implementation of upstream logic blocks otherwise. We have also assumed that all the values are from the same clock cycle T. Based on the following logic equivalency which uses De Morgan's Theorem $$f(t_1 \oplus r_1, t_2 \oplus r_2, t_3 \oplus r_1, \ldots) \oplus r_1 = \overline{r_1 r_2} f(t_1, t_2, t_3, \ldots) + \overline{r_1} r_2 f(t_1, \overline{t_2}, t_3, \ldots) + r_1 \overline{r_2} f(\overline{t_1}, t_2, \overline{t_3}, \ldots) + r_1 r_2 \overline{f(\overline{t_1}, \overline{t_2}, \overline{t_3}, \ldots)} \quad \text{(EQN.2)}$$

EQN. 2 forms the structure of a MUX.

Figure 4:
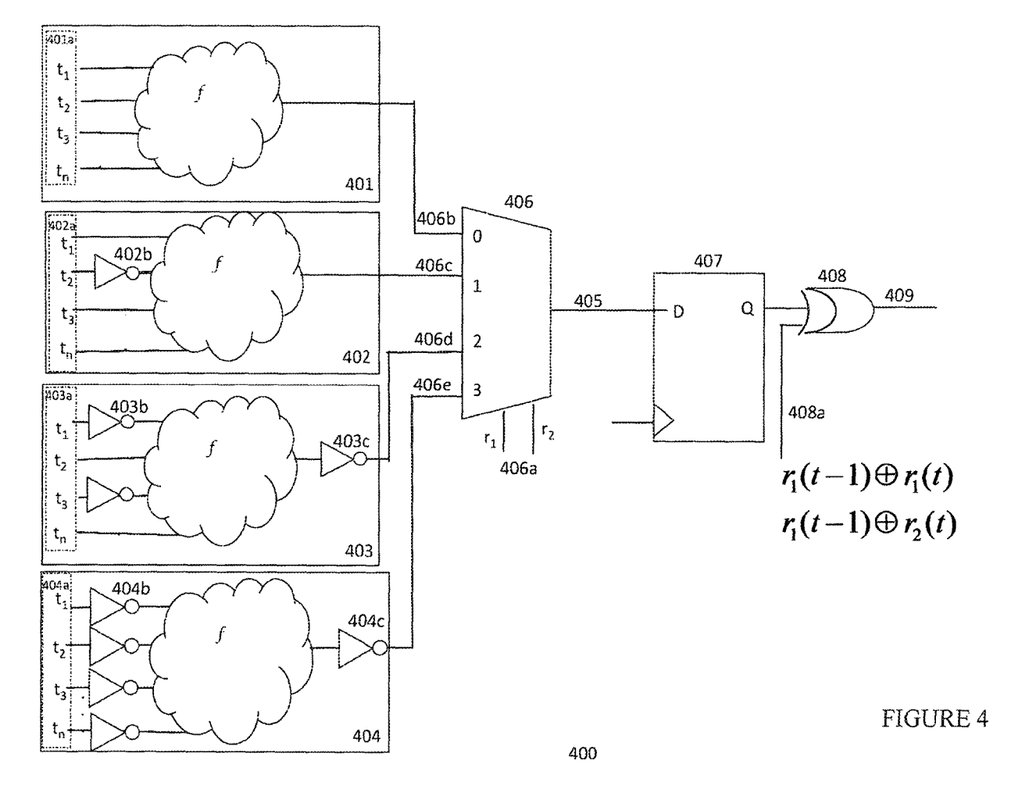
FIG. 4 is one embodiment of the MUX-based implementation method of randomized encoding scheme for a sequential logic with two random bits.

Refer to FIG. 4 for the corresponding randomized dual-rail implementation 400 of f. The four logic blocks 401, 402, 403 and 404 are identical except the additional inverters 402b, 403b, 404b at some of the inputs 402a, 403a, 404a ($t_1$, $t_2, \ldots$) and the additional inverter at the outputs 403c, 404c. A 4:1 MUX 406 with two randomly generated bits $r_1 r_2$ as select signal 406a is used to decide its output 405 to the register 407. The output 405 is also in dual-rail representation with random rail $r_1$ when $r_1$ is preselected as random rail or random state to be used, and with $r_2$ as the non-preselected as random rail or random state. The output of the register 407 is sent to an XOR gate 408 with $r_1 \oplus r_1'$ as the second input 408a, where $r_1'$ is the value of $r_1$ in the past clock cycle or as depicted in FIG. 4; the representation $r'_1$ is the same as $r_1(t-1)$. In this way the output 409 is in dual-rail representation with $r_1$ when $r_1$ is preselected as random rail or random state to be used. We can also set the select signal 408a to $r_2 \oplus r_1'$, in which case the output 409 is in dual-rail representation with $r_2$ when $r_2$ is preselected as random rail or random state to be used. Note that the final XOR 408 uses $r_1 \oplus r_1'$ or $r_2 \oplus r_1'$ only if its output is still intermediate (i.e., will be used by the next block). If its output is primary output, then only $r_1'$ needs to be used so its value is converted back to the single rail representation to be used externally.

The MUX-based conversion can have another variation in terms of practical implementation. We can let the conversion use random rail $r_2$ and rewrite EQN 1 as $$f(x_1,x_2,x_3,\ldots) \to f(t_1 \oplus r_1, t_2 \oplus r_2, t_3 \oplus r_1, \ldots) \oplus r_2 \quad (\text{EQN. 3})$$

in which case the converted dual-rail representation uses $r_2$. $t_1$, $t_2$ use $r_1$ when forming the randomized dual-rail representation, while $t_3$ uses $r_2$. i.e., $x_1 = t_1 \oplus r_1$, $x_2 = t_2 \oplus r_1$, $x_3 = t_3 \oplus r_2$, .... The first rail can be re-cast as $$f(t_1 \oplus r_1, t_2 \oplus r_2, t_3 \oplus r_1, \ldots) \oplus r_2 = \overline{r_1 r_2} f(t_1, t_2, t_3, \ldots) + \overline{r_1} r_2 f(\overline{t_1}, t_2, t_3, \ldots) + r_1 \overline{r_2} f(\overline{t_1}, t_2, t_3, \ldots) + r_1 r_2 \overline{f(t_1, t_2, t_3, \ldots)} \quad (\text{EQN. 4})$$

Figure 5:
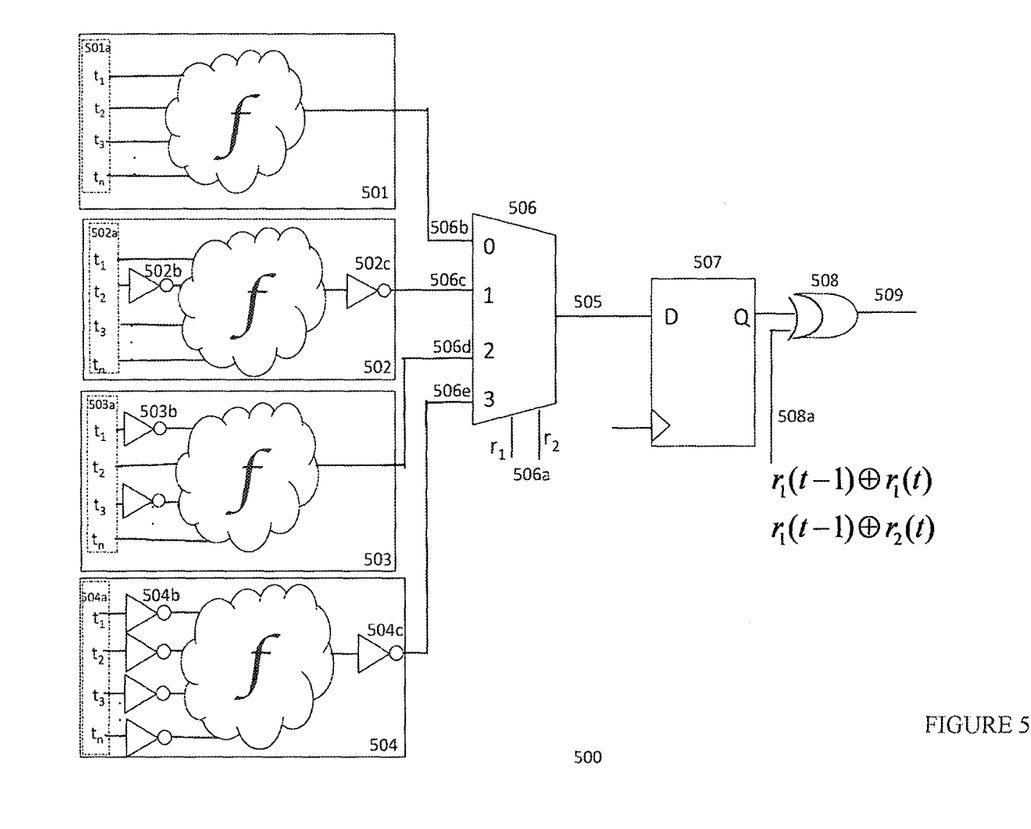
FIG. 5 is one embodiment of an alternative MUX-based implementation method of randomized encoding scheme for a sequential logic with two random bits.

Refer to FIG. 5 for the corresponding randomized dual-rail implementation 500. Compared with 400, the four logic blocks 501, 502, 503 and 504 are identical except the locations of the inverters 502c and 504c at the outputs. A 4:1 MUX 506 with two bits $r_1 r_2$ as select signal 506a is used to decide its output 505. The output 505 is also in dual-rail representation with random rail $r_2$. The output of the register 507 is sent to an XOR gate 508 with $r_1 \oplus r_2'$ as the second input, where $r_2'$ is the value of $r_2$ in the past clock cycle, which is the same as $r_2(t-1)$. This configuration will render the final output 509. Note that the final XOR 508 uses $r_1 \oplus r_2'$ or $r_2 \oplus r_2'$ only if its output is still intermediate (i.e., will be used by the next block). If its output is a primary output, then only $r_2'$ needs to be used so its value is converted back to the single rail representation to be used externally. Compared with the implementation 400 (see FIG. 4), this different implementation will result in different power and area overhead. One skilled in the art can easily create other variations following similar process described in this embodiment.

For the randomized dual-rail logic to be effective, it must protect the two random rails as well as the input and output of all the registers. This is a significant advantage over any existing methods, where part of the information can be obtained if any part of the chip is compromised. The following embodiment will explain how the randomized dual-rail implementation can be effectively protected from data leakage hardware Trojans.

Figure 6:
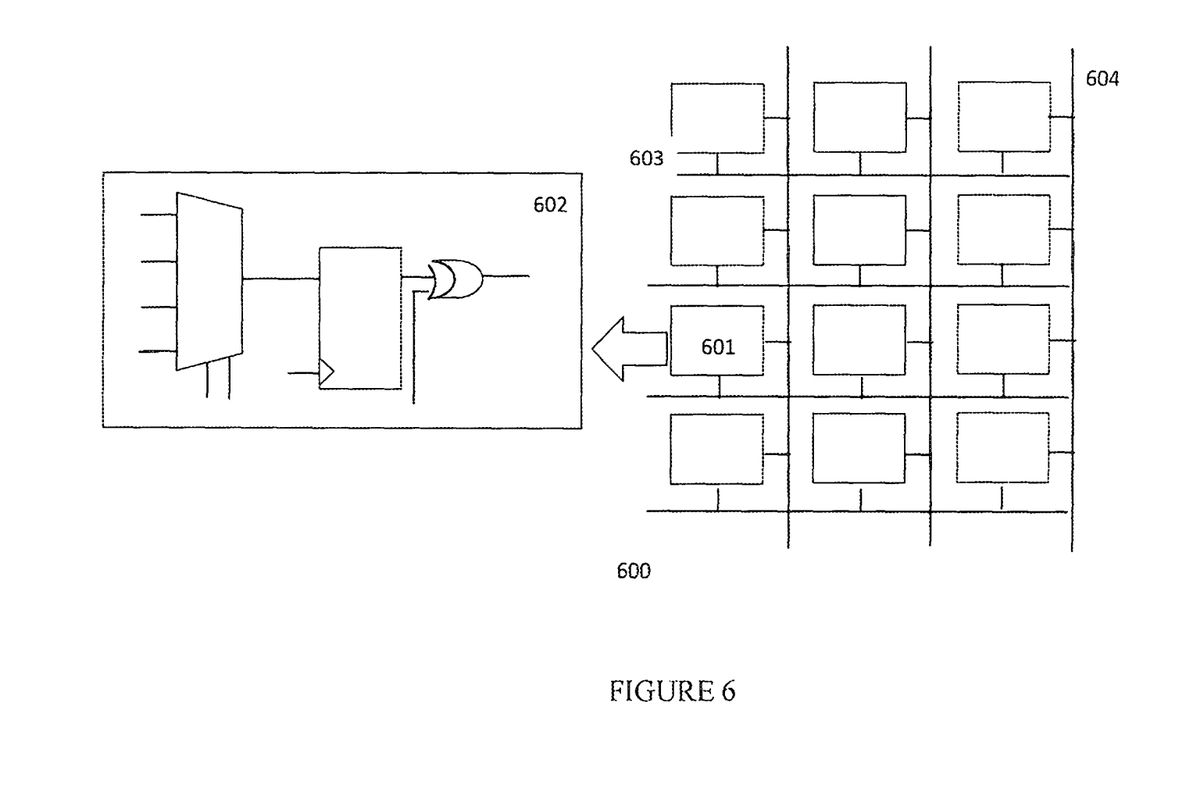
FIG. 6 is one embodiment of the partition method for designs implemented with the MUX-based methods in FIG. 4 and FIG. 5.

The protection is based on the existing technology of three-dimensional integration, which allows two chips to be fabricated separately and then stacked vertically. The electrical interconnections between the two chips when vertically stacked, are enabled by through-silicon-vias (TSVs). Based on three-dimensional integration, it is within the scope of the invention to place the random number generators, all the registers and the MUXes in the top die, which is fabricated in a secure facility, and the rest of the sequential logic in the bottom die, which can be outsourced and fabricated in an untrustworthy facility. The two dies can then be stacked together in a secure facility. In addition, since the only designs needed in the top die are registers and MUXes in a regular structure, which are independent of the function of the sequential logic in the bottom die, it is possible to pre-fabricate a generic top die in an array structure, which contains regularly placed cells of registers and MUXes. Depending on the detailed placement of the bottom die, only some of the cells will be used. Refer to FIG. 6 for an illustration 600 of the structure. Each cell 601 contains the regular structure 602 formed by a 4:1 MUX, a register and an XOR, and the two random rails 603 and 604 send the two random bits to each cell in a crossbar structure.

Figure 7:
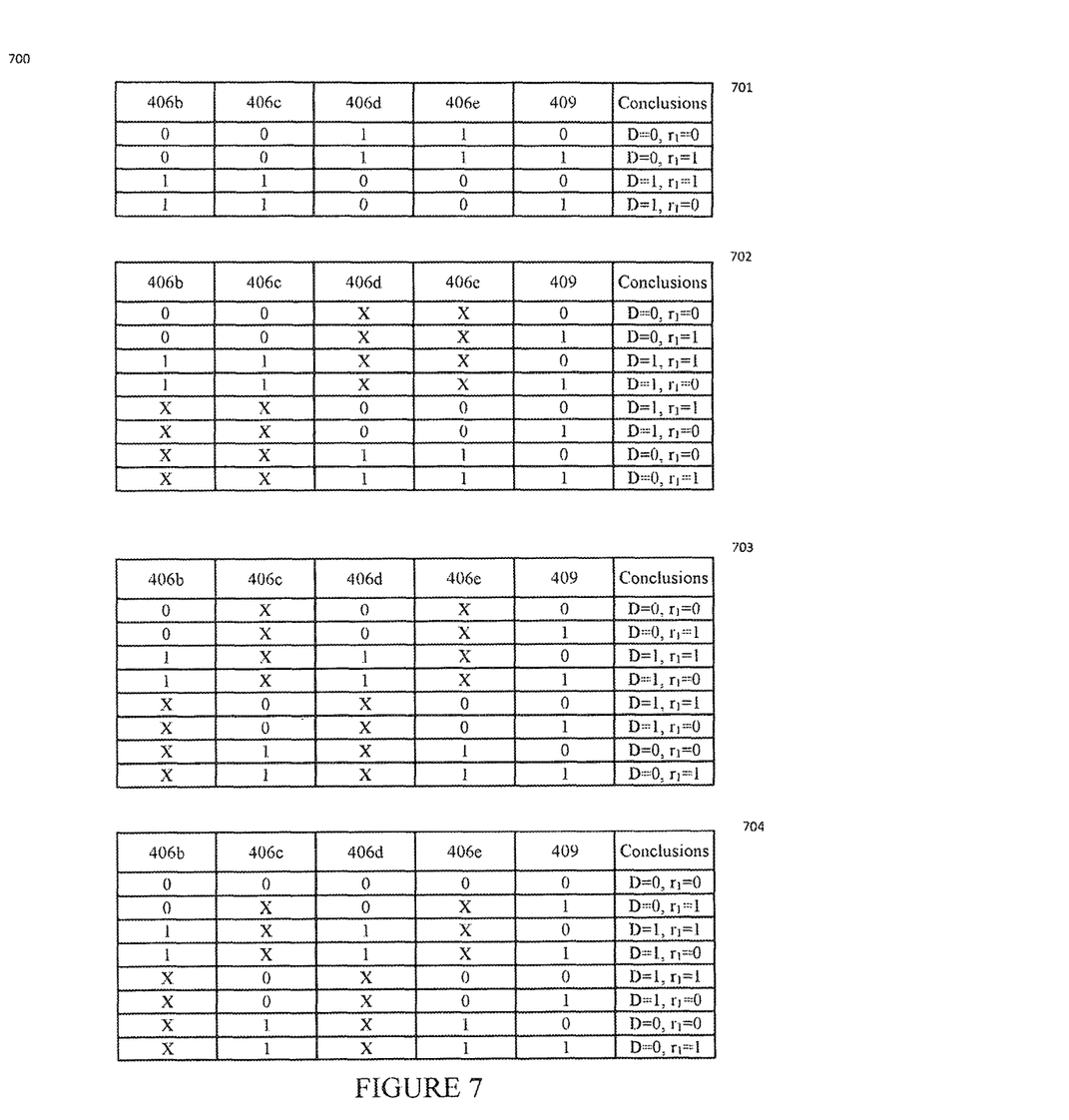
FIG. 7 illustrates one layout based on the partition method in FIG. 6. It is useful for understanding the concepts described herein.

It is important to point out that the method does not always protect the information in the chip. In certain scenarios it is possible for an attacker to infer the information based on the data collected at the I/Os of the top die. To successfully infer an internal signal, an attacker will need to inject Trojans to monitor all the inputs at the corresponding MUX and as well as the output of the XOR. For example, referring back to FIG. 4, in design 400, although the MUXes and the register are in the top die where an attacker has no access, the inputs 406b, 406c, 406d, 406e to the 4:1 MUX 406 and the output 409 of the XOR gate 408 are all on the bottom die and are accessible to an attacker. An attacker will need to inject Trojans at these locations to monitor them. As 409 comes from 406b, 406c, 406d, 406e (selected by the two random rails $r_1$ and $r_2$), it is possible to identify the values of $r_1$ and $r_2$. For example, assume a scenario where 406b and 406c are 0's and 406d and 406e are 1's. Then if $r_1$ is 0, either 406b or 406c will be selected and 405 will always be 0. If $r_1$ is 1, either 406d or 406e will be selected and 405 will always be 1. Since 405 is in dual-rail representation with $r_1$ as the random rail, we can know that the corresponding data on 405 is 0 (either "00" or "11" correspond to 0). Furthermore, based on the logic value at 409 in the next cycle and comparing it with this value at 405, we can infer the value of either $r_1$ or $r_2$ in the next cycle, depending on whether the output is set to dual-rail signal with $r_1$ or $r_2$. Assuming that 409 is set to dual-rail signal with $r_1$, following the same logic reasoning, all the scenarios where attackers can infer data from design 400 are illustrated in FIG. 7. The scenarios 701 assume the attacker has no knowledge of the values of the two random rails $r_1'$ and $r_2'$ in the previous clock cycle. The scenarios 702 assume the attacker has knowledge of the value of the random rail $r_1'$ in the previous clock cycle. The scenarios 703 assume the attacker has knowledge of the value of the random rails $r_2'$ in the previous clock cycle. The scenarios 704 assume the attacker has knowledge of the values of both of the random rails $r_1'$ and $r_2'$ in the previous clock cycle. Compared with the total number of possible scenarios, however, the chances are still low.

It is worthwhile to point out that the different possible variations in implementation create an additional layer of protection. The above discussion assumes that an attacker knows the detailed circuit implementation to identify the information. However, with the many possible variations, unless an attacker can know directly from the fabrication which one is exactly used in the chip he intends to hack, which is a very challenging task, the only way he would be able to know so would be through reverse-engineering, which will damage the chip and no information can be obtained.

Clearly many modifications and variations of the present invention are possible in light of the above teachings. It should therefore be understood that, within the scope of the inventive concept, the invention may be practiced otherwise than as specifically claimed.

What is claimed is:
1. A sequential logic circuit security apparatus, comprising:
   at least two combinational logic circuit functions each having an output and at least one pair of logic inputs;
   at least two random logic state generators each randomly outputting a logic state 1 or 0;

a first encoder for encoding each logic input of said at least one pair of logic inputs with a Boolean operation on a preselected one of said at least two random logic state generators;
a multiplexer having an output, and at least two selectable inputs each being connected to a respective said output of said at least two combinational logic circuit functions,
wherein said multiplexer selects one of said outputs of said at least two combinational logic circuit functions according to said logic state of said at least two random logic state generators;
a latch having an input connected to said output of said multiplexer, an output, and a clock input;
an exclusive OR circuit having an output, a first input connected to said latch output, and a second input,
wherein said second input is encoded by a second encoder performing said Boolean operation on a current clock cycle state and a prior clock cycle state of said preselected one of said at least two random logic state generators.

2. The apparatus of claim 1, wherein said Boolean operation is an exclusive OR operation.

3. The apparatus of claim 2, wherein said second input is encoded by a second encoder performing said Boolean operation on:
a current clock cycle state of a non-preselected one of said at least two random logic state generators; and
a prior clock cycle state of said preselected one of said at least two random logic state generators.

4. The method of claim 2, wherein said Boolean operation is an exclusive OR operation.

5. The method of claim 4, wherein said second input is encoded by a step of performing said Boolean operation on:
a current clock cycle state of a non-preselected one of said at least two random logic states; and
a prior clock cycle state of said preselected one of said at least two random logic states.

6. In a sequential logic circuit having at least two combinational logic circuit functions each having an output and at least one pair of logic inputs, a security method for use therewith, comprising the steps of:
generating at least two random logic states each randomly comprising a logic state 1 or 0;
encoding each logic input of said at least one pair of logic inputs with a Boolean operation on a preselected one of said at least two random logic states;
selectively multiplexing said output of said at least two combinational logic circuit functions according to a logic state of said at least two random logic states;
latching said multiplexed output of said at least two combinational logic circuit functions;
exclusively OR'ing a first input comprising said multiplexed output of said at least two combinational logic circuit functions, with an encoded second input,
wherein said second input is encoded by a step of performing said Boolean operation on a current clock cycle state and a prior clock cycle state of said preselected one of said at least two random logic states.

7. A secure logic chip as an article of manufacture comprising a logic portion and a security portion, wherein said logic portion comprises a plurality of combinational logic circuits each having inputs and an output;
said security portion comprises:
a random logic state generator producing two randomly generated logic states;
a multiplexer,
having as inputs said outputs of said combinational logic circuits; and
having a selection among said inputs based upon the logic state of said two randomly generated logic states;
a latch for latching an output of said multiplexer; and
an exclusive OR for decoding an output of said latch as a function of at least one of said two randomly generated logic states; and
wherein said logic portion and said security portion are manufactured as separate chips and thereafter functionally integrated into said secure logic chip; and
wherein said logic portion and said secure portion are functionally integrated by:
arrangement as a physical stack; and
through-silicon-vias to establish electrical connections between said logic portion and said secure portion.

8. A semiconductor chip as an article of manufacture for securely encoding logic circuits, comprising:
an array of security encoding cells fabricated onto said semiconductor chip, wherein each said cell further comprises:
a multiplexer,
having as inputs those outputs of said logic circuits to be securely encoded; and
having a selection among said inputs based upon the logic state of one or more randomly generated logic states;
a latch for latching an output of said multiplexer; and
an exclusive OR for decoding an output of said latch as a function of said one or more randomly generated logic states;
a crossbar structure for electrically interconnecting said one or more randomly generated logic states to all said security encoding cells in said semiconductor chip; and
through-silicon-vias to establish electrical connections between said security encoding cells and said logic circuits.

* * * * *